(12) United States Patent
Namaike et al.

(10) Patent No.: US 9,017,497 B2
(45) Date of Patent: Apr. 28, 2015

(54) METHOD OF MANUFACTURING LAMINATED CORE SEGMENT

(75) Inventors: Kazuki Namaike, Fukuoka (JP);
Tadashi Shibuta, Fukuoka (JP);
Akikazu Higuchi, Fukuoka (JP);
Takeshi Sato, Fukuoka (JP)

(73) Assignee: Mitsui High-Tec, Inc., Kitakyushu-shi (JP)

( * ) Notice: Subject to any disclaimer, the term of this patent is extended or adjusted under 35 U.S.C. 154(b) by 13 days.

(21) Appl. No.: 13/546,064

(22) Filed: Jul. 11, 2012

(65) Prior Publication Data
US 2013/0020010 A1    Jan. 24, 2013

(30) Foreign Application Priority Data

Jul. 22, 2011    (JP) ................................. 2011-161190

(51) Int. Cl.
*B32B 41/00* (2006.01)
*H02K 15/02* (2006.01)

(52) U.S. Cl.
CPC .................................. *H02K 15/022* (2013.01)

(58) Field of Classification Search
CPC   B23B 2311/00; B23B 37/1054; B23B 41/00; H02K 15/02
USPC ........... 156/64, 350, 351, 360, 367, 378, 379; 310/216.113; 29/596
See application file for complete search history.

(56) References Cited

U.S. PATENT DOCUMENTS

| 6,877,214 B2 * | 4/2005 | Neuenschwander et al. ... 29/609 |
| 2009/0289522 A1 * | 11/2009 | Buban .................... 310/216.113 |

FOREIGN PATENT DOCUMENTS

| JP | 07-051762 A | 2/1995 |
| JP | 2006-026662 A | 2/2006 |
| JP | 2010-143125 A | 7/2010 |
| JP | 2010-213505 A | 9/2010 |
| JP | 2011-101464 A | 5/2011 |

OTHER PUBLICATIONS

Notification of Reasons for Refusal dated Feb. 10, 2015, issued in corresponding Japanese Patent Application No. 2011-161190 (4 pages).

* cited by examiner

*Primary Examiner* — Michael N Orlando
*Assistant Examiner* — Joshel Rivera
(74) *Attorney, Agent, or Firm* — Westerman, Hattori, Daniels & Adrian, LLP

(57) ABSTRACT

A method of manufacturing laminated core segments including: a process to blank and laminate, wherein the segment core sheets formed in the adjacent virtual lines are aligned so that directions of the segment core sheets alternate, each of the segment core sheets are blanked and formed by a die device, and the laminated core segments are formed by laminating the blanked segment core sheets in the die device; a process to eject, wherein each of the laminated core segments formed by blanking and laminating in each virtual line is ejected from the die device; and a process to identify a blanking position, wherein the distinguishing marks are provided for the laminated core segments to identify the virtual lines therefor.

6 Claims, 4 Drawing Sheets

METHOD OF MANUFACTURING LAMINATED CORE SEGMENT

TECHNICAL FIELD

The present invention relates to a method of continually manufacturing laminated core segments from a wide thin strip material made of a magnetic steel sheet, the laminated core segments to be an annular laminated core.

BACKGROUND ART

When manufacturing, for example, a stator (stator core) of a large motor, blanking and forming an annular core sheet from a wide thin strip material results in a low material yield. For example, Patent Literature 1 discloses a method in which laminated core segments are manufactured by dividing an annular core by one or a plurality of magnetic pole sections, wires are wound around the magnetic pole sections of the laminated core segments, and then a plurality of the laminated core segments are combined to make one laminated core.

Patent Literature 2 discloses a method including a pressing process line and a measuring line. In the method, steel laminas are formed from a strip workpiece manufactured in the pressing process line, the steel laminas are then laminated to be a temporarily-laminated body, and then a laminated core is manufactured by permanently caulking the temporarily-laminated body. At the same time, a height of the laminated core is measured and a result thereof is input into a controller to increase or reduce a number of laminas used to make a new laminated core before being offered as a product.

CITATION LIST

Patent Literature

[Patent Literature 1] Japanese Unexamined Patent Application Publication No. 2010-213505
[Patent Literature 2] Japanese Unexamined Patent Application Publication No. 2010-143125

SUMMARY OF INVENTION

Technical Problem

However, in the technique of Patent Literature 2, only one laminated core is manufactured from one strip workpiece. Therefore, this technique cannot solve particular problems in manufacturing a plurality of core sheets in a plurality of lines from a wide thin strip material.

Specifically, when manufacturing a plurality of core sheets in a plurality of lines from a wide thin strip material, production efficiency is enhanced as the number of the lines is increased. However, the thin strip material has thickness deviation in a width direction, i.e., the thickness of the thin strip material is generally thick in a center and thin at both ends thereof. Therefore, thicknesses of laminated cores including a same number of core sheets are different according to the line in which the core sheets are manufactured.

In view of the above circumstances, an object of the present invention is to provide a method of manufacturing laminated core segments, capable of distinguishing the laminated core segments according to lines, hereinafter the line is referred to as "virtual line" because the line has no real existence, in which the laminated core segments are manufactured. A plurality of the virtual lines are formed in a width direction of a wide thin strip material. The method is further capable of measuring and adjusting a thickness of the laminated core segment as necessary.

Solution To Problem

To accomplish the above object, a method of manufacturing laminated core segments according to a first aspect of the present invention is a method of manufacturing laminated core segments, the laminated core segments to be a circumferentially-divided annular laminated core, the method comprising:

a) a process to blank and laminate a plurality of segment core sheets, the process comprising steps of
   i) blanking the plurality of the segment core sheets by a die device, wherein the segment core sheets are arranged in a plurality of virtual lines formed in a width direction on a thin strip material made of a magnetic material, positions of the segment core sheets to be blanked are changed arbitrarily along a feed direction of the thin strip material, and further the segment core sheets in the adjacent virtual lines are aligned in a way that directions of the segment core sheets alternate, and
   ii) laminating each of the blanked segment core sheets in the die device and thereby forming the laminated core segments;
b) a process to eject the laminated core segments from the die device, wherein the laminated core segments are ejected while being sorted by each of the virtual lines where the laminated core segments are formed by blanking and laminating the segment core sheets; and
c) a process to identify each blanking position of the laminated core segments by distinguishing marks, the distinguishing marks provided for the laminated core segments, the distinguishing marks different for each of the virtual lines where the laminated core segments are formed.

A method of manufacturing laminated core segments according to a second aspect of the present invention includes the method of manufacturing laminated core segments according to the first aspect of the present invention, wherein the distinguishing mark comprises one of or a combination of a cut-out, a recess, a through-hole, or a printed mark formed in part of each of the segment core sheets.

A method of manufacturing laminated core segments according to a third aspect of the present invention includes the method of manufacturing laminated core segments according to the first and second aspects of the present invention, wherein whether the laminated core segment is good or defective is judged according to the virtual line by a property of the laminated core segment distinguished by the distinguishing mark.

A method of manufacturing laminated core segments according to a fourth aspect of the present invention includes the method of manufacturing laminated core segments according to the first to third aspects of the present invention, wherein image recognition is used to identify the distinguishing mark of the virtual line.

A method of manufacturing laminated core segments according to a fifth aspect of the present invention includes the method of manufacturing laminated core segments according to the third aspect of the present invention, wherein whether the laminated core segment is good or defective is judged by either or both of a re-pressing process and a visual inspection process.

A method of manufacturing laminated core segments according to a sixth aspect of the present invention includes the method of manufacturing laminated core segments according to the fifth aspect of the present invention, wherein a gradual-pressing process is provided after the re-pressing process and before the visual inspection process, the gradual-pressing process for gradually applying different amount of pressures to the laminated core segment.

Advantageous Effects of Invention

The method of manufacturing laminated core segments according to the present invention has the following effects.
(1) It is possible, even after the laminated core segment is manufactured, to distinguish a virtual line in which each of the laminated core segments is manufactured because the laminated core segment is provided with a distinguishing mark for each virtual line. Therefore, it is possible to judge if a thickness of the thin strip material is thin in part in a width direction by measuring a thickness of the laminated core segment with the distinguishing mark thereon.
(2) It is further possible to control the number of the segment core sheets to be a laminated core segment in each virtual line, manufacture laminated core segments with reference to a thickness of a laminated core segment formed in a thin part of the thin strip material, and adjust a thickness of a too thick laminated core segment by removing part of the segment core sheets.

DESCRIPTION OF EMBODIMENTS

Referring to the accompanying drawings, embodiments of the present invention will be described for a better understanding of the invention.

Figure 3:
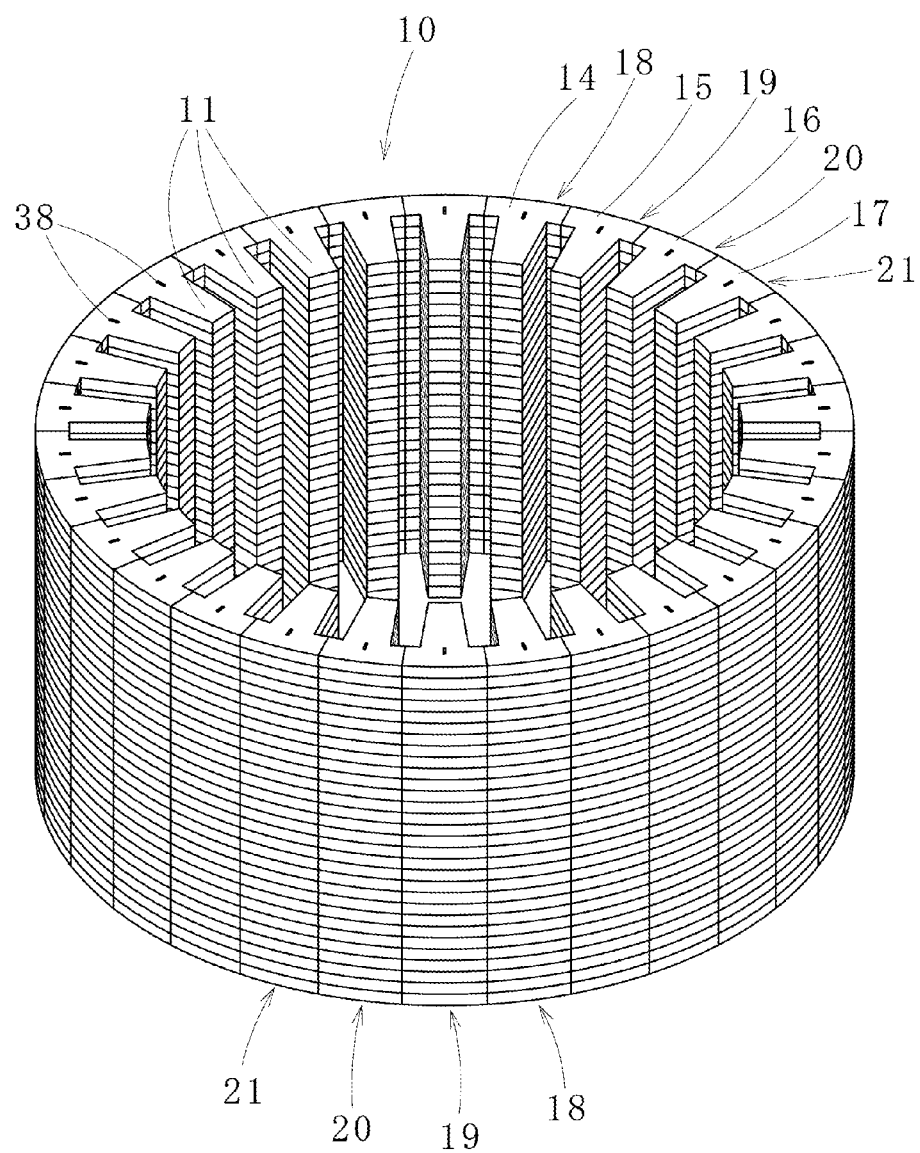
FIG. 3 is a perspective view of a laminated core manufactured by the method of manufacturing the laminated core segments.

As shown in FIG. 3, a laminated core 10 manufactured by a method of manufacturing laminated core segments according to one embodiment of the present invention includes laminated core segments circumferentially-divided by each magnetic pole section 11. The laminated core 10 is formed by joining yoke sections of the laminated core segments with each other while annularly disposing the laminated core segments. A lead (conductive wire) is wound around each magnetic pole section 11 when the laminated core 10 is used. The annularly-disposed laminated core segments include laminated core segments 18 to 21 formed by laminating segment core sheets 14 to 17, respectively.

Figure 1:
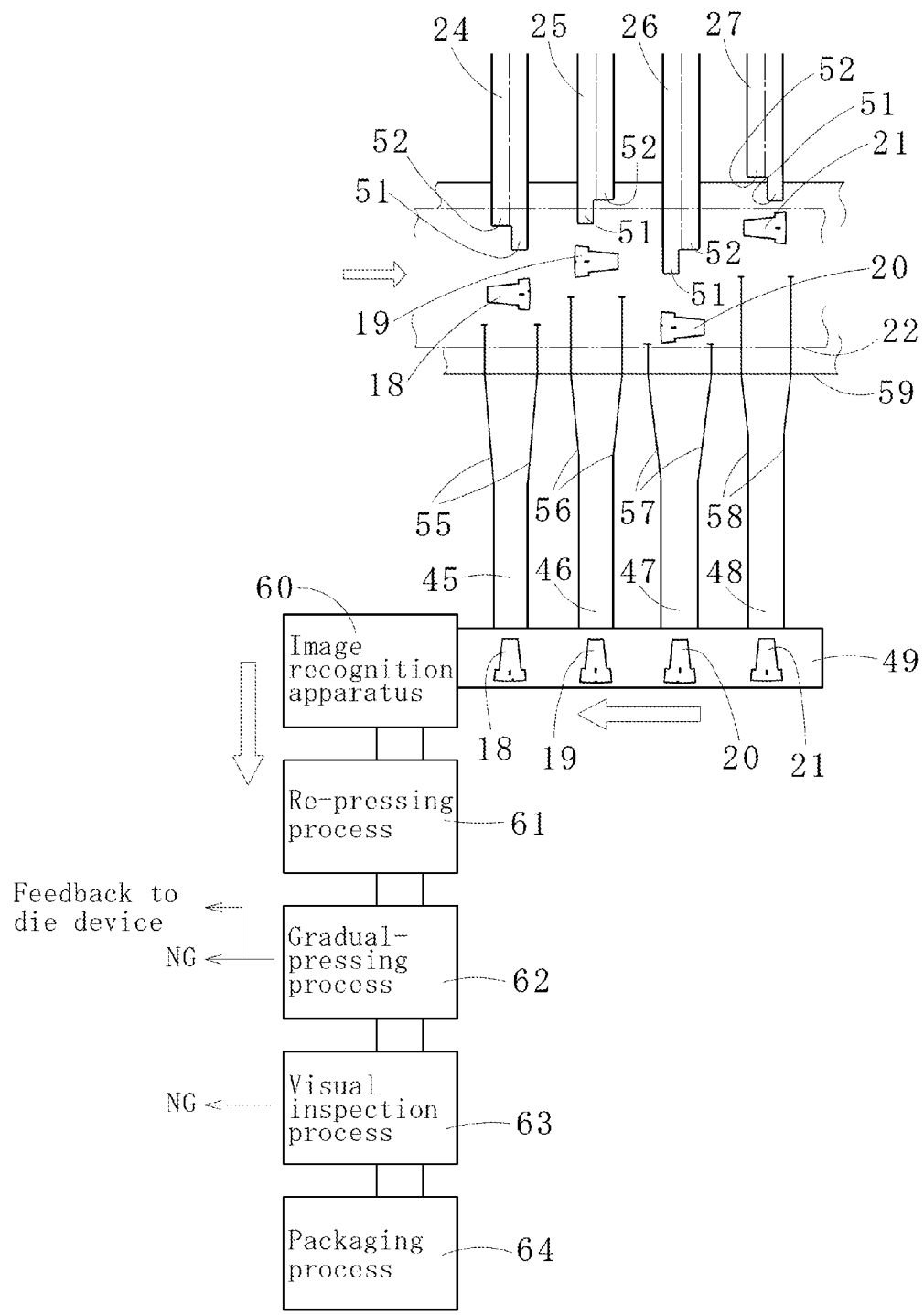
FIG. 1 is an explanatory diagram showing a method of manufacturing laminated core segments according to one embodiment of the present invention.
Figure 2:
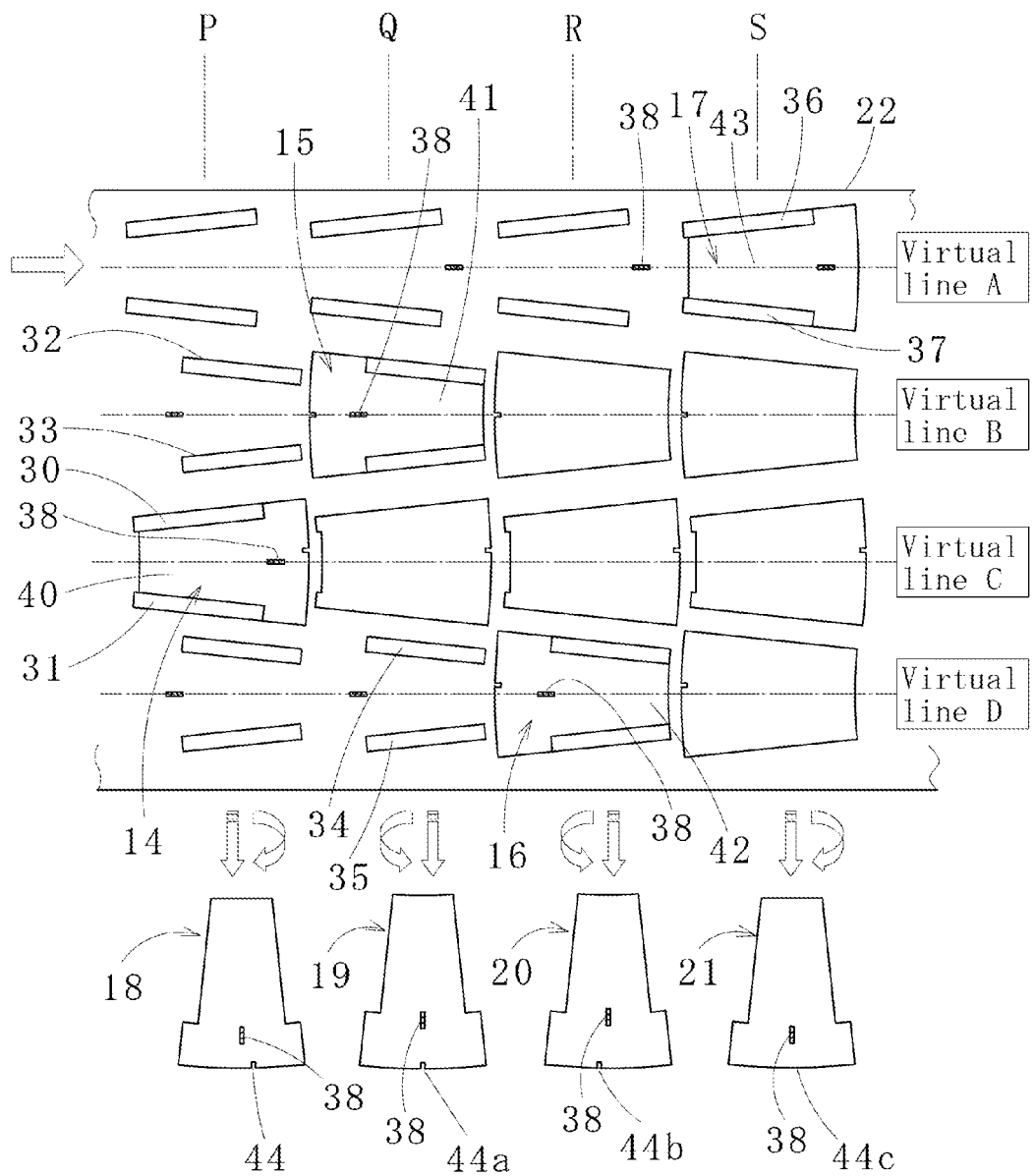
FIG. 2 is an explanatory diagram showing the method of changing a direction of the laminated core segment in the method of manufacturing the laminated core segments.

As shown in FIGS. 1 and 2, in a method of manufacturing the laminated core segments 18 to 21, a plurality of virtual lines C, B, D, and A (hereinafter simply referred to as "A to D") are formed in a width direction of a thin strip material 22 made of a magnetic material. The virtual lines A to D are formed according to a number of segment core sheets 14 to 17 to be blanked (punched out), and face in a direction of movement (feed direction) of the thin strip material. The segment core sheets 14 to 17 are arranged in the adjacent virtual lines A to D in a way that directions of the segment core sheets 14 to 17 alternate, and the segment core sheets 14 to 17 are blanked by an unillustrated die device (press machine). The blanked segment core sheets 14 to 17 are separately laminated in the die device to form the laminated core segments 18 to 21 (a process to blank and laminate).

The laminated core segments 18 to 21 blanked and laminated separately in the virtual lines A to D are pushed on one sides thereof by pushers 24 to 27, rotated ¼ turn (i.e., 90 degrees), and aligned in a same direction to be ejected from the die device (a process to eject).

The laminated core segments 18 to 21 are respectively marked with distinguishing marks 44 and 44a to 44c according to the virtual lines A to D (See FIG. 4), and the virtual lines A to D for the laminated core segments 18 to 21 are identified by the distinguishing marks 44 and 44a to 44c (a process to identify a blanking position). Hereinafter, the detail descriptions thereon will be given.

Pilot holes (not shown) are formed on both ends of an uncoiled thin strip material 22 of a predetermined width and of a thickness, for example, of 0.15 to 5 mm. As shown in FIGS. 1 and 2, with reference to the pilot holes, slots 30 to 37 are blanked on both ends of the segment core sheets 14 to 17, and a caulking portion 38 is formed on a center in a width direction of each of the segment core sheets 14 to 17. The caulking portion 38 is well-known half-press caulking (half-hollow rivet) or V-shaped caulking. Accordingly, magnetic pole shaft pieces 40 to 43 are formed between the slots 30 and 31, 32 and 33, 34 and 35, and 36 and 37, respectively.

In addition, each of the segment core sheets 14 to 17 disposed at a lowermost part of the respective laminated core segments 18 to 21 does not include a caulking portion with a projection for caulking projected from a bottom of each of the segment core sheets 14 to 17, but includes a caulking through-hole (i.e., a caulking portion formed as a through-hole), into which a projection for caulking of each of the segment core sheets 14 to 17 disposed immediately thereabove is inserted (Description of the caulking through-hole is omitted because it is well-known.) The segment core sheet with the caulking through-hole cannot be laminated on the segment core sheet blanked therebefore, thus the caulking through-hole is used to separate the laminated core segments 18 to 21.

Next, the segment core sheets 14 to 17 are blanked to fall into dies at different positions P, Q, R, and S in the direction of movement of the thin strip material 22, and caulked and laminated to form the laminated core segments 18 to 21 (See FIG. 2). In this embodiment, the positions P, Q, R, and S where the segment core sheets 14 to 17 are blanked (i.e., the positions where the segment core sheets are formed) are provided as applicable, for example, on the virtual lines C, B, D, and A, respectively. The positions P, Q, R, and S can be provided on the virtual lines in a different order as long as each of the positions P, Q, R, and S is provided on each different virtual line. Since the laminated core segments 18 to 21 are blanked to fall under the dies with postures as arranged in the thin strip material 22, yoke sections of the laminated core segments 18 and 21 are directed to the direction of movement of the thin strip material 22, and yoke sections of the laminated core segments 19 and 20 are directed opposite to the direction of movement of the thin strip material 22.

Figure 4:
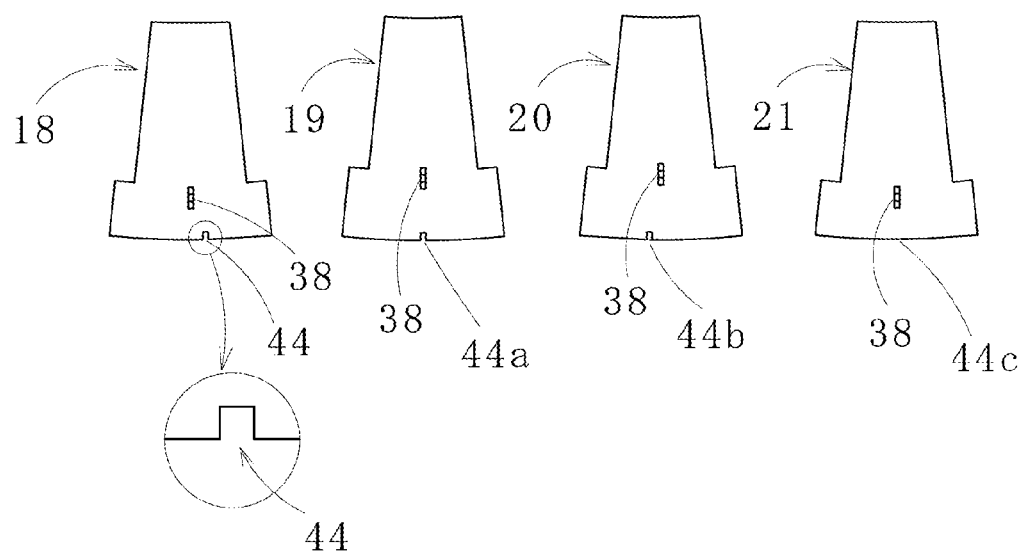
FIG. 4 is a detailed explanatory view of the method of manufacturing the laminated core segments.

Here, the laminated core segments 18 to 21 have distinguishing marks 44 and 44a to 44c to distinguish from each other. As shown in FIG. 4, the distinguishing marks 44 and 44a to 44c are rectangular cut-outs formed on outer sides in radial directions of the yoke sections. The distinguishing mark 44 for the laminated core segment 18 is located to the right of an axis (center), the distinguishing mark 44a for the laminated core segment 19 is located on a position of the axis, the distinguishing mark 44*b* for the laminated core segment 20 is located to the left of the axis, and the distinguishing mark 44*c* for the laminated core segment 21 does not have any cut-out. Thus, the four types of laminated core segments 18 to 21 can be distinguished from each other.

Therefore, it is possible to identify which positions (virtual lines) on the thin strip material 22 the segment core sheets 14 to 17 are respectively blanked from and which of the segment core sheets 14 to 17 the laminated core segments 18 to 21 are respectively formed by. Since normally the thin strip material 22 is processed by rolling, a thickness of the thin strip material 22 is constant in a length direction but not constant in a width direction. The distinguishing marks allow to distinguish the laminated core segments 18 to 21, which are different in thickness (property) according to blanking positions in the width direction of the thin strip material 22.

The laminated core segments 18 to 21 are pushed by the pushers 24 to 27 and placed on carrying conveyors (belt conveyors) 45 to 48. The laminated core segments 18 to 21 are transferred onto the transverse conveyor 49 located at a forward end of the carrying conveyors 45 to 48. Ends of the pushers 24 to 27 are L-shaped, having projecting portions 51 on one halves and recessed portions 52 on the other halves in a width direction. Proximal ends of the pushers 24 to 27 are connected to a linear movement means such as a linear motor, a hydraulic cylinder, or a pneumatic cylinder, and the pushers 24 to 27 move back and forth in groove-shaped guides (not shown) at a constant extrusion speed.

Widths of the pushers 24 to 27 are 0.5-fold to 1-fold of radial lengths of the laminated core segments 18 to 21, lengths of the projecting portions 51 formed at the ends of the pushers 24 to 27 are 0.5-fold to 0.9-fold of the radial lengths of the laminated core segments 18 to 21. The projecting portions 51 abut (touch) the yoke sections of the laminated core segments 18 to 21 and rotate the laminated core segments 18 to 21 90 degrees to the directions where the projecting portions 51 abut the yoke sections thereof. After that, the laminated core segments 18 to 21 are carried by the carrying conveyors 45 to 48 connected to an end of an under-die holder 59. Here, both sides of the carrying conveyors 45 to 48 include guide members 55 to 58.

The guide members 55 to 58 are straight (parallel) on the under-die holder 59 under a die, on the under-die holder 59 the laminated core segments 18 to 21 are placed. Widths of the guide members 55 to 58 gradually narrow until being parallel again. Thus, the laminated core segments 18 to 21 can be aligned and carried in a same direction (i.e., with the yoke sections directed forward). The laminated core segments 18 to 21 transferred on the transverse conveyor 49 are directed in the same direction and carried to an image recognition apparatus 60 used for the process to identify the blanking position. The laminated core segments 18 to 21 are transferred from the carrying conveyors 45 to 48 to the transverse conveyor 49 by a well-known way (e.g., by elevating either the carrying conveyors 45 to 48 or the transverse conveyor 49).

The laminated core segments 18 to 21 are transferred into the image recognition apparatus 60, and presence or absence and places of the distinguishing marks 44 and 44*a* to 44*c* are detected to distinguish the laminated core segments 18 to 21 from each other (image recognition). In a re-pressing process 61, suitable pressures are applied to the laminated core segments 18 to 21 (it is preferable to apply pressures of about $\frac{1}{20}$ to $\frac{1}{2}$ of elastic limits of the laminated core segments 18 to 21.) In a gradual-pressing process 62, thicknesses of the laminated core segments 18 to 21 are measured as the pressures are gradually lowered (in stages, from a heavy pressure (load) to a medium pressure, and further to a light pressure).

Here, if the thicknesses of the laminated core segments 18 to 21 are different from a specified thickness T, the distinguishing marks are identified and the thicknesses are measured. After this, in a visual inspection process 63, appearance of the laminated core segments 18 to 21 are inspected. The laminated core segments 18 to 21 with poor appearance or the laminated core segments 18 to 21 with thicknesses different from the specified thickness T are removed from a production line, and only the laminated core segments 18 to 21 judged as good are packaged in a packaging process 64.

In addition, if the laminated core segments 18 to 21 with thicknesses different from the specified thickness T are found in the gradual-pressing process 62, following procedures are performed:

(1) First Procedure

If the thicknesses of the laminated core segments 18 to 21 are judged to be thinner than the specified thickness T, the laminated core segments are removed from the production line as defective. Also, an instruction is issued to the die device to increase the number of segment core sheets to be laminated so that all of the laminated core segments 18 to 21 maintain the specified thickness T. If almost all of the segment core sheets have a predetermined thickness and part of the segment core sheets have an excess thickness exceeding the predetermined thickness, the distinguishing mark of the laminated core segment including the segment core sheets having the excess thickness is identified and the thickness thereof is measured. Then, information of the distinguishing mark and the measured thickness is fed back to the die device to reduce a number of lamination of segment core sheets in a virtual line for the laminated core segment with the excess thickness, thereby the thickness of the laminated core segment in the virtual line becomes the specified thickness T. At the same time, a defective laminated core segment after measurement is not sent to a subsequent process but removed from the production line. One or a plurality of segment core sheets are removed (detached) from the laminated core segment with the excess thickness to make the laminated core segment have the specified thickness T before being shipped as a product.

(2) Second Procedure

When a thickness of each of the laminated core segments 18 to 21 is measured in the gradual-pressing process 62, if one of the laminated core segments has an insufficient thickness, the laminated core segment is immediately removed from the production line as defective. Also, information thereof is fed back to the die device to increase the number of lamination of the segment core sheets in a virtual line for the laminated core segment with the insufficient thickness so that the laminated core segment has the specified thickness T. A thickness of a laminated core segment formed by the die device is determined by setting the die device a number of lamination of the segment core sheets having the caulking through-holes. Of course, a laminated core segment in the die device is removed by the pusher before a caulking through-hole is blanked and formed in a segment core sheet.

Accordingly, even if the laminated core segments have slight variations in the thickness, each thickness of the laminated core segments 18 to 21 forming a product (a finished laminated core) can always be controlled to be a constant thickness.

The present invention is not limited to the above-described embodiments, and other embodiments and various modifications may be made without departing from the scope of the present invention. For example, in the above-described embodiments, the distinguishing mark includes a rectangular cut-out, but the distinguishing mark may include one of or a combination of a cut-out having another shape other than the rectangular shape, a recess, a through-hole, or a printed mark.

INDUSTRIAL APPLICABILITY

As is clear from the above description, the method of manufacturing laminated core segments according to the present invention enables controlling the number of segment core sheets to be laminated. Therefore, laminated cores with higher quality can be manufactured while preventing loss of material, thus more efficient motors can be offered more economically.

REFERENCE SIGNS LIST

10: laminated core, 11: magnetic pole section, 14 to 17: segment core sheet, 18 to 21: laminated core segment, 22: thin strip material, 24 to 27: pusher, 30 to 37: slot, 38: caulking portion, 40 to 43: magnetic pole shaft piece, 44, 44a to 44c: distinguishing mark, 45 to 48: carrying conveyor, 49: transverse conveyor, 51: projecting portion, 52: recessed portion, 55 to 58: guide member, 59: under-die holder, 60: image recognition apparatus, 61: re-pressing process, 62: gradual-pressing process, 63: visual inspection process, 64: packaging process

The invention claimed is:

1. A method of manufacturing laminated core segments, the laminated core segments to be a circumferentially-divided annular laminated core, the method comprising:
  a) a process to blank and laminate a plurality of segment core sheets, the process comprising steps of
    i) blanking the plurality of the segment core sheets by a die device, wherein the segment core sheets are arranged in a plurality of virtual lines formed in a width direction on a thin strip material made of a magnetic material, positions of the segment core sheets to be blanked are changed arbitrarily along a feed direction of the thin strip material, and further the segment core sheets in the adjacent virtual lines are aligned in a way that directions of the segment core sheets alternate, and
    ii) laminating each of the blanked segment core sheets in the die device and thereby forming the laminated core segments;
  b) a process to eject the laminated core segments from the die device, wherein the laminated core segments are pushed by pushers and aligned in a same direction to be ejected while being sorted by each of the virtual lines where the laminated core segments are formed by blanking and laminating the segment core sheets; and
  c) a process to identify the laminated core segments by distinguishing marks, the distinguishing marks being provided for the laminated core segments and indicating respective blanking positions of the segment core sheets forming the respective laminated core segments, the distinguishing marks being different for each of the virtual lines from which the laminated core segments are formed.

2. The method as defined in claim 1, wherein the distinguishing mark comprises one of or a combination of a cut-out, a recess, a through-hole, or a printed mark formed in part of each of the segment core sheets.

3. The method as defined in claim 1, wherein whether the laminated core segment is good or defective is judged according to the virtual line by a property of the laminated core segment distinguished by the distinguishing mark.

4. The method as defined in claim 1, wherein image recognition is used to identify the distinguishing mark of the virtual line.

5. The method as defined in claim 3, wherein whether the laminated core segment is good or defective is judged by either or both of a re-pressing process and a visual inspection process.

6. The method as defined in claim 5, wherein a gradual-pressing process is provided after the re-pressing process and before the visual inspection process, the gradual-pressing process for gradually applying different amount of pressures to the laminated core segment.

* * * * *